US006866798B2

(12) United States Patent
Miyoshi et al.

(10) Patent No.: US 6,866,798 B2
(45) Date of Patent: Mar. 15, 2005

(54) POLYAMIDE COMPOSITION

(75) Inventors: Takaaki Miyoshi, Kimitsu (JP);
Junichi Nakahashi, Kimitsu (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 57 days.

(21) Appl. No.: 10/350,107

(22) Filed: Jan. 24, 2003

(65) Prior Publication Data

US 2003/0149178 A1 Aug. 7, 2003

Related U.S. Application Data

(62) Division of application No. 09/782,025, filed on Feb. 14, 2001, now abandoned.

(30) Foreign Application Priority Data

Feb. 15, 2000 (JP) ........................................ 2000-037005

(51) Int. Cl.$^7$ ............................ C08L 79/00; C08L 71/12
(52) U.S. Cl. ........................... 252/500; 525/63; 525/66; 525/92 B; 525/133
(58) Field of Search ........................ 525/63, 66, 92 B, 525/133; 252/500

(56) References Cited

U.S. PATENT DOCUMENTS

| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,428,699 A | 2/1969 | Schleimer |
| 3,756,999 A | 9/1973 | Stetter et al. |
| 3,822,227 A | 7/1974 | Hermann et al. |
| 3,876,721 A | 4/1975 | Yashi et al. |
| 4,054,612 A | 10/1977 | Yagi et al. |
| 4,315,086 A | 2/1982 | Ueno et al. |
| 4,642,358 A | 2/1987 | Aycock et al. |
| 5,272,236 A | 12/1993 | Lai et al. |
| 5,869,572 A * | 2/1999 | van der Meer et al. ....... 525/66 |
| 6,075,091 A * | 6/2000 | Tanaka et al. ................ 525/66 |

FOREIGN PATENT DOCUMENTS

| DE | 22-01862 | 9/1977 |
| DE | 30-47915 | 7/1982 |
| JP | 50-051197 | 5/1975 |
| JP | 77-017880 | 5/1977 |
| JP | 60-035006 | 2/1985 |
| JP | 60-035007 | 2/1985 |
| JP | 60-035008 | 2/1985 |
| JP | 61-204262 | 9/1986 |
| JP | 62-129350 | 6/1987 |
| JP | 63-152628 | 6/1988 |
| JP | 2-135246 | 5/1990 |
| JP | 2-201811 | 8/1990 |
| JP | 31-63088 | 7/1991 |
| JP | 92-012283 | 3/1992 |
| JP | 51-55930 | 6/1993 |
| JP | 5-339496 | 12/1993 |
| JP | 80-48869 | 2/1996 |
| JP | 10-310695 | 11/1998 |

\* cited by examiner

Primary Examiner—Ana Woodward
(74) Attorney, Agent, or Firm—Birch, Stewart, Kolasch & Birch, LLP

(57) ABSTRACT

The present invention relates to a polyamide composition comprising (A) polyamide, (B) polyphenylene ether, and (C) an ethylene-α-olefin copolymer prepared using a single site catalyst. The resin composition of the present invention can provide a polyamide composition having excellent impact resistance and excellent surface smoothness, and displaying only small dimensional changes after water absorption.

23 Claims, No Drawings

POLYAMIDE COMPOSITION

This application is a divisional of application Ser. No. 09/782,025, filed on Feb. 14, 2001 abandoned and for which priority is claimed under 35 U.S.C. § 120; and this application claims priority of Application No. 2000-37005 filed in JAPAN on Feb. 15, 2000 under 35 U.S.C. § 119; the entire contents of both of these applications are hereby incorporated by reference.

FIELD OF THE INVENTION

The present invention relates to a composition having excellent impact strength and surface smoothness and displaying only small dimensional changes after water absorption. The composition of the present invention is applicable to a wide range of uses such as automobile parts, electric and electronic parts, and mechanical parts.

BACKGROUND ART

A polymer alloy comprising a polyamide and a polyphenylene ether can become a very useful material by being incorporated with an elastomer, and conventionally has been applied to various uses.

For example, Japanese Patent Application Laid-Open No. 61-204262 discloses a composition comprising polyamide, polyphenylene ether and a styrene type hydrocarbon polymer block-conjugated diene type elastomer block copolymer. Further, Japanese Patent Application Laid-Open Nos. 62-129350, 2-135246 and 5-339496 disclose that a rubbery polymer composition containing polyphenylene ether, polyamide, an ethylene-α-olefin copolymer and the like has improved impact resistance.

However, the above prior art has been effective at improving the impact strength of compositions, but there is a big problem that a continuous phase of the polyamide absorbs water from the air resulting in a great size change of the molded piece.

In recent days, there has been an increasing demand for electroconductive materials, especially integrated circuit tray materials and electrostatically painted external trim parts for automobiles and motorcycles. Namely, they have been required to have high electroconductivity in addition to impact resistance, surface smoothness and small dimensional changes after water absorption.

As prior art relating to electroconductive resin compositions, Japanese Patent Application Laid-Open No. 8-48869 discloses that an electroconductive resin composition having a low melt viscosity and high impact resistance can be obtained by incorporating an electroconductive carbon black into a compatibilized polyphenylene etherbase resin. Further, Japanese Patent Application Laid-Open No. 10-310695 discloses an electroconductive composition comprising polyethylene ether, an impact modifying polymer containing ethylenically unsaturated structural units in a specific amount or more, various polyamides and an electroconductive carbon black.

However, the electroconductivity values in the above prior documents are measured between fractured surfaces of a broken off molded piece. In other words, it is measured by totally ignoring influences of the skin layer of the molded piece. Generally, such a process for charging a molded article wherein the molded article is broken off and then a voltage is applied thereto is not actually practical. The electroconductivity measured according to such a method is not practical at all. Moreover, the compositions obtained by the prior art are less worth using because of their inferior appearance (surface smoothness).

In general, the electroconductivity and the surface smoothness are contradictory properties. Namely, materials having higher surface smoothness tend to have inferior electroconductivity.

The electroconductivity is measured by applying a silver paste to two faces facing each other and measuring a resistance value therebetween. Accordingly, materials having higher surface smoothness have a lower contact area with the silver paste so that the resistance value of the materials tend to be higher.

However, there has been demanded materials exhibiting high electroconductivity without deteriorating impact resistance, surface smoothness and the small dimensional changes after water absorption, wherein the electroconductivity is measured without breaking off a molded piece.

On the other hand, Japanese Patent Application Laid-Open No. 2-201811 discloses a resin composition comprising polyphenylene ether, polyamide and an electroconductive carbon black wherein the electroconductive carbon black is introduced mainly in the polyamide, and it teaches that the electroconductivity (surface resistivity) is achieved by a method wherein a piece is not broken off from a molded article. However, according to this prior art, properties important to the composition (impact resistance, surface smoothness and small dimensional changes after water absorption) are greatly deteriorated so that the resultant composition is less worth using.

As described above, none of prior art has completely satisfied market demands for a composition having excellent impact resistance and surface smoothness and displaying only small dimensional changes after water absorption. In addition, it has been very difficult to impart to compositions high electroconductivity which can be achieved by a method wherein a piece is not broken off from a molded article.

SUMMARY OF THE INVENTION

An object of the present invention is to provide a composition having excellent impact resistance and surface smoothness and displaying only small dimensional changes after water absorption. The term "small dimensional changes after water absorption" herein means that a molded piece prepared using the composition of the present invention exhibits the same water absorption as those prepared using other compositions, but displays smaller changes in dimension than them.

Another object of the present invention is to provide a composition having excellent electroconductivity in addition to excellent impact resistance, excellent surface smoothness and small dimensional changes after water absorption.

The present inventors have made extensive and intensive studies to avoid the above-mentioned problems and have found that a composition comprising polyphenylene ether, polyamide, an ethylene-α-olefin copolymer prepared using a single site catalyst has excellent impact resistance, excellent surface smoothness and small dimensional changes after water absorption. As a result, the present invention has been accomplished.

Namely, the present invention relates to a composition having excellent impact resistance and surface smoothness and displaying only small dimensional changes after water absorption, which comprises:

(A) 50 to 95% by weight of polyamide based on the total of components (A) and (B);
(B) 50 to 5% by weight of polyphenylene ether based on the total of components (A) and (B); and
(C) 1 to 30 parts by weight, based on 100 parts by weight of the total of components (A) and (B), of an ethylene-α-olefin copolymer prepared using a single site catalyst and/or an ethylene-α-olefin copolymer prepared using a single site catalyst and modified with one or more compounds selected from the group consisting of α,β-unsaturated dicarboxylic acid and derivatives thereof.

BEST MODE FOR CARRYING OUT THE INVENTION

Hereinafter, the present invention is illustrated in more detail.

As component (A) of polyamide usable in the present invention, any polyamide can be employed as long as it contains an amide bond {—NH—C(=O)—} in the polymer main chain. In general, polyamides can be obtained by ring opening polymerization of lactams, polycondensation of diamine and dicarboxylic acid, polycondensation of aminocarboxylic acid, and the like, but preparation methods are not limited thereto.

As the diamine, aliphatic diamine, alicyclic diamine and aromatic diamine can be exemplified. Specifically, they include tetramethylenediamine, hexamethylenediamine, undecamethylenediamine, dodecamethylenediamine, tridecamethylenediamine, 2,2,4-trimethyl hexamethylenediamine, 2,4,4-trimethyl hexamethylenediamine, 5-methyl nanomethylenediamine, 1,3-bisaminomethyl cyclohexane, 1,4-bisaminomethyl cyclohexane, m-phenylenediamine, p-phenylenediamine, m-xylylenediamine, p-xylylenediamine and the like.

As the dicarboxylic acid, aliphatic dicarboxylic acid, alicyclic dicarboxylic acid and aromatic dicarboxylic acid can be exemplified. Specifically, they include adipic acid, suberic acid, azelaic acid, sebacic acid, dodecanoic diacid, 1,1,3-tridecanoic diacid, 1,3-cyclohexane dicarboxylic acid, terephthalic acid, isophthalic acid, naphthalenedicarboxylic acid, dimer acid, and the like.

As the lactams, there can be specifically exemplified ε-caprolactam, enantholactam, ω-laurolactam, and the like.

Further, as aminocarboxylic acid, there can be specifically exemplified ε-aminocaproic acid, 7-aminoheptanoic acid, 8-aminooctanoic acid, 9-aminononanoic acid, 11-aminoundecanoic acid, 12-aminododecanoic acid, 13-aminotridodecanoic acid, and the like.

In the present invention, there can be employed any of copolymerized polyamides obtained by subjecting the above-listed lactams, diamines, dicarboxylic acids and aminocarboxylic acids individually or in combination to polycondensation. Further, there can be advantageously used polyamides obtained by polymerizing the above-listed lactams, diamines, dicarboxylic acids and aminocarboxylic acids in a polymerization reactor to be a low molecular weight oligomer and making the oligomer polymeric using an extruder and the like.

The polyamides most advantageously usable in the present invention include polyamide 6, polyamide 66, polyamide 46, polyamide 11, polyamide 12, polyamide 610, polyamide 612, polyamide 6/66, polyamide 6/612, polyamide MXD6 (MXD: m-xylylenediamine), polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 6/12/6T, polyamide 66/12/6T, polyamide 6/12/6I, polyamide 66/12/6I, and the like. Polyamides obtained by copolymerizing a plurality of polyamides using an extruder and the like can be also employed. These polyamides may be used alone or in combination.

A number-average molecular weight of the polyamides used in the present invention is preferably 5,000 to 100,000, more preferably 10,000 to 30,000. The polyamides used in the present invention may be a mixture of plural polyamides having different molecular weights. For example, there can be exemplified a mixture of a low molecular weight polyamide having a number-average molecular weight of 10,000 or less and a polymeric polyamide having a number-average molecular weight of 30,000 or more; a mixture of a low molecular weight polyamide having a number-average molecular weight of 10,000 or less and a common polyamide having a number-average molecular weight of approximately 15,000; and the like. However, the polyamides used in the present invention are not limited to the above examples.

Further, different types of polyamides having different molecular weights may be mixed.

The end groups of the polyamide are involved in a reaction with polyphenylene ether. Polyamides usually contain an amino group, and a carboxyl group as an end group. In general, when a concentration of carboxyl groups exceeds that of amino groups, the impact resistance is decreased and the fluidity is improved. In contrast, when a concentration of amino groups exceeds that of carboxyl groups, the impact resistance is improved and the fluidity is decreased. A ratio of amino groups/carboxyl groups is preferably 9/1 to 1/9, more preferably 8/2 to 1/9, further more preferably 6/4 to 1/9. A concentration of end amino groups is preferably at least 10 milliequivalent/kg, more preferably 30 milliequivalent/kg or more.

The amino end groups may be prepared in accordance with the conventional methods known to the skilled in the art. For example, they are prepared by adding diamines, dicarboxylic acids or monocarboxylic acid upon polymerizing polyamides. The polyamides used in the present invention may be a mixture of plural polyamides having different concentrations of end groups.

Further, for the purpose of improving thermal stability of the polyamides, there can be used a metallic stabilizer as represented by the following known formula (1):

$$M_n^{y+} X_{n \cdot y/z}^{z-} \qquad (1)$$

wherein M represents a metallic ion selected from the group consisting of copper, potassium, nickel, tin and cerium; X represents an ion group selected from the group consisting of a halogenated ion and a carboxylated ion; n is an integer of 1 to 6; y is an integer representing a positive ionic charge of M; and z is an integer representing a negative ionic charge of X.

Specific examples of the metallic stabilizer include CuI, $CuCl_2$, copper acetate, potassium iodide, cerium stearate, and the like. These components may be used in combination. A preferable amount of the metallic stabilizer to be incorporated is 0.001 to 1 part by weight based on 100 parts by weight of polyamide.

Component (B) of polyphenylene ether used in the present invention is a homopolymer or a copolymer comprises structural units represented by the following formula (2):

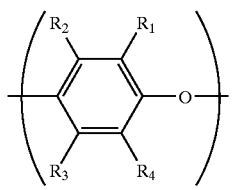

(2)

wherein $R_1$ and $R_4$ each independently represent hydrogen, halogen, primary or secondary lower alkyl, phenyl, haloalkyl, aminoalkyl, oxy-hydrocarbon, or oxy-halohydrocarbon (provided that at least two carbon atoms separate a halogen atom and an oxygen atom); and $R_2$ and $R_3$ each independently represent hydrogen, halogen, primary or secondary lower alkyl, phenyl, haloalkyl, oxy-hydrocarbon or oxy-halohydrocarbon (provided that at least two carbon atoms separate a halogen atom and an oxygen atom).

A reducing viscosity of the homopolymer and/or the copolymer (measured: 0.5 g/dl, a chloroform solution, 30° C.) is preferably 0.15 to 0.70, more preferably 0.20 to 0.60, and even more preferably 0.40 to 0.55. There is no problem in blending two or more polyphenylene ethers having different reducing viscosity for use.

Specific examples of polyphenylene ether used in the present invention include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1, 4-phenylene ether), and the like. Further, they include polyphenylene ether copolymers prepared by copolymerizing 2,6-dimethylphenol with other phenols such as 2,3,6-trimethylphenol and 2-methyl-6-butylphenol. Of these, poly (2,6-dimethyl-1,4-phenylene ether) and a copolymer of 2,6-dimethylphenol and 2,3,6-trimethylphenol are preferable. More preferable is poly(2,6-dimethyl-1,4-phenylene ether).

The production method of polyphenylene ether used in the present invention is not particularly limited as long as it is prepared according to the well known methods. For example, polyphenylene ether used in the present invention can be easily prepared according to the method disclosed in U.S. Pat. No. 3,306,874 wherein oxidative polymerization of, for instance, 2,6-dimethylphenol is carried out using a complex of primary copper chloride and amine as a catalyst. In addition, the polyphenylene ether can be easily prepared according to the methods disclosed in U.S. Pat. Nos. 3,306, 875, 3,257,357 and 3,257,358, Japanese Patent Publication No. 52-17880, and Japanese Patent Application Laid-Open Nos. 50-51197 and 63-152628.

Further, polyphenylene ether (B) used in the present invention may be entirely or partially modified. The modified polyphenylene ether herein indicates those modified by at least one modifier compound containing in the molecular structure at least one carbon-carbon double or triple bond and at least one carboxylic acid, acid anhydride, amino, hydroxyl or glycidyl group.

The modified polyphenylene ether is prepared according to:
(1) a method comprising reacting non-melted polyphenylene ether and a modifier compound in the presence or absence of a radical initiator at a temperature from 100° C. to the glass transition point of polyphenylene ether;
(2) a method comprising reacting polyphenylene ether and a modifier compound by melt mixing in the presence or absence of a radical initiator at a temperature from the glass transition point of polyphenylene ether to 360° C.; and
(3) a method comprising reacting polyphenylene ether and a modifier compound in a solution in the presence or absence of a radical initiator at a temperature lower than the glass transition point of polyphenylene ether.

Any one of the above-mentioned methods can be employed. Of these, preferred is methods (1) and (2), and most preferred is method (1).

Hereinafter, the at least one modifier compound containing in the molecular structure, at least one carbon-carbon double or triple bond and at least one carboxylic acid, acid anhydride, amino, hydroxyl or glycidyl group is specifically described.

As a modifier compound containing in the molecule a carbon-carbon double bond, a carboxylic acid group and an acid anhydride group at the same time, there can be exemplified maleic acid, fumaric acid, chloromaleic acid, cis-4-cyclohexene-1,2-dicarlboxylic acid and acid anhydride thereof. Particularly, fumaric acid, maleic acid, maleic anhydride are preferred. Fumaric acid and maleic anhydride are especially preferred. Further, monoester or diester type of unsaturated dicarboxylic acid can be used in the present invention.

As a modifier compound containing in the molecule a carbon-carbon double bond and a glycidyl group at the same time, there can be exemplified allyl glycidyl ether, glycidyl acrylate, glycidyl methacrylate, epoxidized natural oil, and the like. Of these, glycidyl acrylate and glycidyl methacrylate are particularly preferred.

As a modifier compound containing in the molecule a carbon-carbon double bond and a hydroxyl group at the same time, there can be exemplified unsaturated alcohol represented by the general formula, $C_nH_{2n-3}OH$ (wherein n is a positive integer) such as allyl alcohol, 4-penten-1-ol, 1,4-pendadiene-3-ol; unsaturated alcohol represented by the general formulas, for example, $C_nH_{2n-5}OH$ and $C_nH_{2n-7}OH$ (wherein n is a positive integer); and the like.

The above-listed modifier compounds may be used alone or in combination.

Further, in the polyphenylene ether (B) used in the present invention, an organic solvent derived from a polymerization solvent may remain in an amount of less than 5% by weight based on 100 parts by weight of polyphenylene ether. The organic solvent derived from the polymerization solvent is difficult to be completely removed at a drying step after polymerization, and it usually remains in an amount from several hundreds ppm to several percents. Herein, the organic solvent derived from a polymerization solvent includes at least one of toluene, an isomer of xylene, ethylbenzene, alcohols having 1 to 5 carbon atoms, chloroform, dichloromethane, chlorobenzene, dichlorobenzene and the like.

Moreover, the polyphenylene ether used in the present invention includes those containing polystyrene (including syndiotactic polystyrene) and/or high impact polystyrene in an amount of less than 400 parts by weight based on 100 parts by weight of polyphenylene ether.

The proportion of polyamide (A)/polyphenylene ether (B) is preferably in the range of 50/50 to 95/5. When an amount of polyamide is under 50% by weight, the surface smoothness is deteriorated. On the other hand, when it is over 95% by weight, the impact resistance is deteriorated.

Component (C) usable in the present invention includes commercially available ethylene-α-olefin copolymers, i.e., an ethylene-α-olefin copolymer prepared using a single site catalyst and/or an ethylene-α-olefin copolymer prepared using a single site catalyst and modified with one or more compounds selected from the group consisting of α,β- unsaturated dicarboxylic acid and derivatives thereof, which copolymers are disclosed in Japanese Patent Publication No. 4-12283 and Japanese Patent Application Laid-Open Nos. 60-35006, 60-35007, 60-35008, 5-155930 and 3-163088 and U.S. Pat. No. 5,272,236. The single site catalyst employed for the preparation of such a copolymer is such that exhibits uniform activity, for instance, a metallocene catalyst containing 1 to 3 molecules of cyclopentadienyl or substituted cyclopentadienyl and a geometrically controlled catalyst.

The ethylene-α-olefin copolymer (C) used in the present invention is polymerized according to vapor phase polymerization or solution polymerization disclosed in the above-mentioned published patents and patent applications. Among them, preferred polymerization method is solution polymerization. Monomers copolymerizable with ethylene units upon the polymerization include an aliphatic substituted vinyl monomer such as propylene, butene-1, pentene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1 and isobutylene; an aromatic vinyl monomer such as styrene and substituted styrene; an ester vinyl monomer such as vinyl acetate, ester acrylate, ester methacrylate, ester glycidylacrylate, ester glycidylmethacrylate and ester hydroxyethylmethacrylate; a nitrogen-containing vinyl monomer such as acrylamide, allylamine, vinyl-p-aminobenzene and acrylonitrile; and diene such as butadiene, cyclopentadiene, 1,4-hexadiene and isoprene; preferably a copolymer of ethylene and at least one $C_{3-20}$ α-olefin, more preferably a copolymer of ethylene and at least one $C_{3-16}$ α-olefin, most preferably a copolymer of ethylene and at least one $C_{3-12}$ α-olefin.

The molecular weight of the ethylene-α-olefin copolymer used in the present invention is preferably 10,000 or more, more preferably 10,000 to 100,000, further more preferably 20,000 to 60,000, in a number-average molecular weight (Mn) measured using 1,2,4-trichlorobenzene as a solvent and an apparatus, 150c-GPC manufactured by Waters Corp., and a polystyrene standard.

The molecular weight distribution of the ethylene-α-olefin copolymer measured according to the above ,GPC (weight-average molecular weight/number-average molecular weight: Mw/Mn). is preferably 3 or less, more preferably 1.8 to 2.7.

The ethylene-α-olefin copolymer prepared using a single site catalyst, which is used in the present invention, preferably contains ethylene units in an amount of 30 to 95% by weight based on the total amount of the ethylene-α-olefin copolymer.

In the present invention, whole or a part of the ethylene-α-olefin copolymer may be a modified with at least one of α,β-unsaturated dicarboxylic acid and derivatives thereof. Specific examples of the α,β-unsaturated dicarboxylic acid and derivatives thereof include maleic acid, fumaric acid, maleic anhydride, and fumaric anhydride. Of these, maleic anhydride is particularly preferred.

In the present invention, it is essential to prepare ethylene-α-olefin copolymers to be used with a single site catalyst. If an ethylene-α-olefin copolymer prepared using a catalyst other than a single site catalyst is employed, the fluidity, electroconductivity and surface smoothness of the resultant composition are unpreferably deteriorated.

A preferable amount of the ethylene-α-olefin copolymer prepared using a single site catalyst of the present invention and/or the ethylene-α-olefin copolymer modified with at least one of α,β-unsaturated dicarboxylic acid and derivatives thereof is 1 to 30 parts by weight based on 100 parts by weight of the total of polyamide and polyphenylene ether. The amount of less than 1 part by weight deteriorates impact resistance. The amount of more than 30 parts by weight deteriorates other properties (for example, thermal resistance).

The composition of the present invention preferably consists of a continuous phase of polyamide and dispersed phases of the other components having a number-average dispersion diameter of 10 μm or less, preferably 5 μm or less. The number-average dispersion diameter herein means a dispersion diameter of a dispersed phase obtained by observing the central part of the molded piece of the composition from the direction perpendicular to the flow direction. Specifically, the number-average dispersion diameter can be obtained by immersing a molded piece in a 10% by weight solution of phosphotungstic acid [12 tungsten (VI) phosphorous acid hydrate: $H_3(PW_{12}O_{40}).nH_2O$] for 4 hours, selectively staining polyamide portions with phosphotungstic acid, photographing the composition with a transmission electron microscope, and measuring portions other than polyamide portions, i.e., dispersion diameters of the dispersed phases from the obtained image to average them. Further, when the dispersion configuration is not spherical, the dispersion diameter is expressed by a circle equivalent diameter. For example, in case of an oval, a circle equivalent diameter is obtained based on an area of the oval obtained from a minor axis and a major axis and the resultant circle equivalent diameter is defined as a dispersion diameter.

In the present invention, an electroconductive filler may be incorporated as component (D) into 100 parts by weight of the total of components (A), (B) and (C) in an amount of less than 10 parts by weight. By incorporating the electroconductive filler additionally, a composition becomes excellent not only in impact resistance and surface smoothness and displays only small dimensional changes after water absorption, but also becomes superior in electroconductivity.

The electroconductive filler used in the present invention includes all types of fillers added to impart electroconductivity to a resin, specifically a powder filler, a flake filler and a fiber filler.

As the powder filler, a carbon black, graphite and the like are suitably used.

As the flake filler, aluminum flake, nickel flake, nickel coated mica and the like are suitably used.

Further, as the fiber filler, carbon fiber, carbon coated ceramic fiber, carbon whisker, metallic fiber such as aluminum fiber, copper fiber, brass fiber and stainless fiber and the like are suitably used.

Of these, carbon fiber, carbon black and graphite are particularly suitable, with carbon black being most suitable.

The carbon fiber usable in the present invention includes all types of fibers obtained by calcining and carbonating fibers prepared using polyacrylonitrile (PAN), pitch or the like as a raw material in an inert atmosphere at a temperature between 1,000° and 3,500° C. The fiber diameter is preferably 1 to 30 μm, more preferably 5 to 20 μm.

The carbon black usable in the present invention includes all types of carbon blacks generally used for imparting electroconductivity. Preferred carbon blacks include an acetylene black obtained by complete combustion of acetylene gas, Ketjen black obtained by conducting incomplete combustion according to the furnace process using crude oil as a raw material, and the like, but are not limited thereto.

Particularly preferred is a carbon black having a dibutylphthalate (DBP) oil absorption of 70 ml/100 mg or more, preferably 100 ml/100 mg or more, more preferably 150 ml/100 mg or more. The DBP oil absorption herein indicates a value measured according to ASTM D2414. Further, a carbon black having a volatile content of less than 1.0% by weight is more preferred.

The electroconductive carbon blacks commercially available include Ketjen black EC-600JD and Ketjen black EC, which are manufactured by Ketjen Black International Co., Ltd. Further, a carbon fibril available from Hyperion Catalyst can be used.

The graphite usable in the present invention includes not only those obtained by heating Kilkenny coal or pitch in an arc oven but also natural graphite. The weight-average particle size of the graphite is preferably 1 to 100 $\mu$m, more preferably 5 to 50 $\mu$m.

These electroconductive fillers may be improved in adhesion property with a resin and handling ability using various conventional coupling agents and/or converging agents.

In the present invention, a block copolymer of an aromatic vinyl compound and a conjugated diene compound and/or a hydrogenated compound thereof may be added as component (E) in an amount of less than 30 parts by weight based on 100 parts by weight of the total of components (A), (B) and (C). By adding the block copolymer of the aromatic vinyl compound and the conjugated diene compound and/or the hydrogenated compound thereof, a composition having an improved balance between impact resistance and surface smoothness can be obtained.

The block copolymer of the aromatic vinyl compound and the conjugated diene compound herein used contains one, preferably two or more polymer blocks comprising mainly aromatic vinyl compounds and at least one polymer block comprising mainly conjugated diene compounds. The weight proportion of aromatic vinyl compounds/conjugated diene compounds in the block copolymer of the aromatic vinyl compound and the conjugated diene compound is desirably 10/90 to 90/10, more desirably 15/85 to 80/20, further more desirably 15/85 to 65/35. Two or more block copolymers having different weight proportions of the aromatic vinyl compounds to the conjugated diene compounds may be blended. Further, a block copolymer containing mineral oil and the like may be employed.

As the aromatic vinyl compound, one or more compounds selected from styrene, $\alpha$-methylstyrene, vinyl toluene, and the like are used. Among them, styrene is most preferably used.

As the conjugated diene compound, one or more compounds selected from butadiene, isoprene, piperine, 1,3-pentadiene, and the like are used. Among them, butadiene, isoprene and the combination thereof are preferably used.

The molecular structure of the block copolymer may be in the form of a linear chain, a branch or a radiation, or in combinations thereof. When butadiene is used as the conjugated diene compound, a 1,2-vinyl content or the total content of a 1,2-vinyl content and a 3,4-vinyl content in the microstructure of polybutadiene blocks is preferably 5 to 80%, more preferably 10 to 70%.

The hydrogenated compound of the block copolymer of the aromatic vinyl compound and the conjugated diene compound is obtained by hydrogenating the above-mentioned block copolymer of the aromatic vinyl compound and the conjugated diene compound to adjust the content of aliphatic double bonds of the polymer block comprising mainly diene compounds to be in the range of more than 0% and 100% or less.

A molecular weight of the block copolymer of the aromatic vinyl compound and the conjugated diene compound and/or the hydrogenated compound thereof used in the present invention is preferably 10,000 to 500,000, most preferably 80,000 to 300,000 in a number-average molecular weight (Mn) which is measured using a chloroform as a solvent at 40° C. with a GPC apparatus (SYSTEM 21) manufactured by Show a Denko K.K. according to a polystyrene standard.

The block copolymer of the aromatic vinyl compound and the conjugated diene compound and/or the hydrogenated compound thereof may be used in combination of two or more different types. Further, those modified with a carboxylic acid group, an acid anhydride group, an amino group, a hydroxyl group, a glycidyl group or the like can be advantageously employed.

The existence morphology of component (E), the copolymer of aromatic vinyl compounds and conjugated diene compound and/or the hydrogenated compound thereof, in the composition is not particularly limited, but it is preferable that it exists in component (B), polyphenylene ether.

A preferable proportion of each component in the composition of the present invention is that the proportion of component (A), polyamide,/component (B), polyphenylene ether, is 50/50 to 95/5, and the proportion of component (C), one or more modifier compounds selected from the ethylene-$\alpha$-olefin copolymer prepared using a single site catalyst and/or $\alpha,\beta$-unsaturated dicarboxylic acid and derivatives thereof, is 1 to 30 parts by weight based on 100 parts by weight of the total of component (A) polyamide and component (B) polyphenylene ether.

In the present invention, a compatible agent may be used upon the preparation of the composition. The compatible agent is used mainly for the purpose of improving physical properties of a polyamide-polyphenylene ether mixture. The compatible agents usable in the present invention are polyfunctional compounds interacting with either polyphenylene ether, polyamide or both of them. The interaction may be chemical (e.g., grafting) or physical (e.g., changing surface characteristics of dispersed phases). Whichever compatible agent is employed, the resultant polyamide-polyphenylene ether mixture exhibits improved compatibility.

Examples of the various compatible agents usable in the present invention include, as described below, a liquid diene polymer, a functional group containing polymer, an epoxy compound, oxidized polyolefin wax, quinones, an organosilane compound and a polyfunctional compound.

Liquid diene polymers suitable for the use in the present invention include a homopolymer of conjugated diene and a copolymer comprising conjugated diene and at least one monomer selected from the group consisting of other conjugated dienes, vinyl monomers (such as styrene and $\alpha$-methylstyrene), olefins (such as ethylene, propylene, butene-1, isobutylene, hexene-1, octene-1 and dodecene-1) and mixtures thereof. The number-average molecular weight of the polymers is 150 to 10,000, preferably 150 to 5,000. The above homopolymers and copolymers can be prepared according to the methods disclosed in U.S. Pat. Nos. 4,054, 612, 3,876,721 and 3,428,699. These polymers include specifically polybutadiene, polyisoprene, poly(1,3-pentadiene), poly(butadiene-isoprene), poly(styrene-butadiene), polychloroprene, poly(butadiene-$\alpha$-methylstyrene), poly(butadiene-styrene-isoprene), poly (butylene-butadiene), and the like.

Functional group containing polymers suitable for the use in the present invention include a copolymer of a vinyl compound, which has in the molecule at least one functional group containing at least one carbon-carbon double bond or carbon-carbon triple bond and at least one of a carboxylic acid group, an acid anhydride group, an amino group, a hydroxide group or a glycidyl group, and an aromatic vinyl compound. The vinyl compound, which has in the molecule at least one functional group containing at least one carbon-carbon double bond or carbon-carbon triple bond and at least one of a carboxylic acid group, an acid anhydride group, an amino group, a hydroxide group or a glycidyl group, is the same as the compounds usable as a modifier compound of polyphenylene ether. One or more compounds selected from these compounds can be used as the vinyl compound. Among these compounds, maleic anhydride, glycidyl acrylate, and glycidyl methacrylate are preferred. Further, the aromatic vinyl compound includes styrene, α-methylstyrene, vinyl toluene and the like. One or more compounds selected from the above compounds are used as the aromatic vinyl compound. Of these, styrene is particularly preferred. Of the functional group containing polymers, most preferred is a styrene-maleic anhydride copolymer.

Epoxy resins suitable for the use in the present invention include:
(1) an epoxy resin produced by condensing polyvalent phenol (such as bisphenol A, tetrabromo bisphenol A, resorcinol, and hydroquinone) and epichlorohydrin;
(2) an epoxy resin produced by condensing polyvalent alcohol (such as ethylene glycol, propylene glycol, butylene glycol, polyethylene glycol, polypropylene glycol, pentaerythritol, and trimethylol ethane) and epichlorohydrin;
(3) a glycidyl etherified product of monovalent alcohols and monovalent phenols such as phenyl glycidyl ether, butyl glycidyl ether and cresyl glycidyl ether;
(4) a glycidyl derivative of an amino compound such as a diglycidyl derivative of aniline; and
(5) an epoxidized product of a higher olefin, cycloalkene, natural unsaturated oil (such as soybeans), or the above-mentioned liquid diene polymers.

The oxidized polyolefin wax suitable for the use in the present invention is well known, of which details and production method are disclosed in U.S. Pat. Nos. 3,822,227 and 3,756,999 and German Patent Nos. 3,047,915 and 2,201,862. In general, the wax is prepared by oxidation or suspension oxidation of polyolefin.

The quinone compound suitable for the use in the present invention is characterized in that it has in the molecule of unsubstituted derivative at least one 6 membered carbon ring; at least two carbonyl groups in the ring structure, both of which may be in the same or, if more than one ring, different rings, provided that they occupy positions corresponding to the 1,2- or 1,4-orientation of the monocyclic quinone; and at least two carbon-carbon double bonds in the ring structure (wherein the carbon-carbon double bonds and the carbonyl carbon-oxygen double bond are in a ring structure and they are conjugated to each other). When two or more rings are present in the non-substituted quinone, they may be a condensed ring, a non-condensed ring or both. Non-fused rings may be bonded to each other by a direct carbon-carbon double bond or a hydrocarbon group having conjugated unsaturation such as =C—C=.

Further, substituted quinone is encompassed within the scope of the present invention. If substitution is desired, a substitution degree may be 1 to the maximum number of replaceable hydrogen atoms. Examples of various substituents capable of being present in the non-substituted quinone structure include halogen; a hydrocarbon group such as chlorine, bromine and fluorine; a branched or non-branched, saturated or unsaturated alkyl, aryl, alkylaryl and cycloalkyl groups and halogenated derivatives thereof; and a similar hydrocarbon group having a hetero atom, particularly oxygen, sulfur and phosphorus (wherein these groups bond to a quinone ring by an oxygen bond through a hetero atom).

Examples of the various quinones include 1,2-benzoquinone, 1,4-benzoquinone, 2,6-diphenylquinone, tetramethyldiquinone, 2,2'-diphenoquinone, 4,4'-diphenoquinone, 1,2-naphthoquinone, 1,4-naphthoquinone, 2,6-naphthoquinone, chloranils, 2-chloro-1,4-benzoquinone, 2,6-dimethylbenzoquinone, and the like.

The organosilane compound suitable for the compatible agent used in the present invention is characterized in that it contains (a) at least one silicon atom bonded to a carbon through an oxygen bond and (b) at least one functional group selected from the group consisting of a carbon-carbon double bond or a carbon-carbon triple bond and/or an amine group and a mercapto group (wherein the functional group is not directly bonded to a silicon atom).

In the organosilane compound contains a C—O—Si component usually exists as an alkoxyl or acetoxy group which is directly bonded to a silicon atom. The alkoxyl or acetoxy group has less than 15 carbon atoms in general, and may contain a hetero atom (such as oxygen). Further, in the organosilane compound, two or more silicon atoms may exist. When multiple silicon atoms exist, they are bonded to each other through an oxygen bond (such as siloxane), a silicon bond or a bifunctional organic group (such as a methylene group or a phenylene group).

Examples of suitable organosilane compounds include γ-aminopropyl triethoxysilane, 2-(3-cyclohexanyl)ethyl trimethoxysilane, 1,3-divinyl tetraethoxysilane, vinyl tris-(2-methoxyethoxy)silane, 5-bicycloheptenyl triethoxysilane and γ-mercaptopropyl trimethoxysilane.

Polyfunctional compounds suitable for the compatible agent of the present invention are of three types. The first type of polyfunctional compounds are those having in the molecule both (a) a carbon-carbon double bond or a carbon-carbon triple bond and (b) at least one carboxylic acid, acid anhydride, acid halide, anhydride, acid halide anhydride, acid amide, acid ester, imide, amino or hydroxy group. Examples of such polyfunctional compounds include maleic acid; maleic anhydride; fumaric acid; citraconic acid; itaconic acid; maleimide; maleic hydrazide; reaction products obtained from diamine and carboxylic acids such as maleic anhydride, maleic acid, fumaric acid and the like; dichloro maleic anhydride; maleic acid amide; unsaturated dicarboxylic acid (such as acrylic acid, butenoic acid, methacrylic acid, t-ethylacrylic acid, pentenoic acid, decenoic acid, undecenoic acid, dodecenoic acid and linoleic acid); ester, acid amide or anhydride of the unsaturated carboxylic acid; unsaturated alcohol (such as alkyl alcohol, crotyl alcohol, methyl vinyl carbinol, 4-pentene-1-ol, 1,4-hexadiene-3-ol, 3-butene-1,4-diol, 2,5-diemthyl-3-hexane-2,5-diol, and alcohols represented by $C_nH_{2n-5}OH$, $C_nH_{2n-7}OH$ and $C_nH_{2n-9}OH$, wherein n is a positive integer of 30 or less); unsaturated amine obtained by substituting one or more —OH groups of the above unsaturated alcohols with $NH_2$ groups; and functionalized diene polymer and copolymer. Of these, compatible agents suitable for the composition of the present invention is maleic anhydride and fumaric acid. This type of compatible agent can be reacted with polyphenylene ether of the present invention in advance.

The second type of polyfunctional compound of the compatible agent suitable for use in the present invention is a compound having both (a) a group represented by the formula (OR) (wherein R is hydrogen, an alkyl group, an aryl group, an acyl group or a carbonyl dioxy group) and (b) at least two groups each of which may be the same or different selected from the group consisting of carboxylic acid, an acid halide, acid anhydride, anhydride, acid halide anhydride, acid ester, acid amide, imide, amino and salts thereof. Typical examples of this group of the compatible agent are aliphatic polycarboxylic acid, acid ester, and acid amide which are represented by the following formula

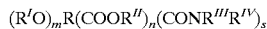
$(R'O)_m R(COOR'')_n (CONR'''R^{IV})_s$ wherein R is a linear or branched chain, saturated aliphatic hydrocarbon having 2 to 20 carbon atoms, preferably 2 to 10 carbon atoms; $R^I$ is selected from the group consisting of hydrogen or an alkyl, aryl, acyl or carbonyl dioxy group having 1 to 10 carbon atoms, preferably 1 to 6 carbon atoms, most preferably 1 to 4 carbon atoms; $R^{II}$ is each independently selected from the group consisting of hydrogen or an alkyl or aryl group having 1 to 20 carbon atoms, preferably 1 to 10 carbon atoms; $R^{III}$ and $R^{IV}$ are each independently selected from the group consisting essentially of hydrogen or an alkyl or aryl group having 1 to 10 carbon atoms, preferably 1 to 6 carbon atoms, most preferably 1 to 4 carbon atoms; m is equal to 1, (n+s) is 2 or more, preferably equal to 2 or 3, and n and s are each 0 or more and wherein (OR') is α or β relative to a carbonyl group, at least two of which is separated by 2 to 6 carbon atoms. Obviously $R^I$, $R^{II}$, $R^{III}$ and $R^{IV}$ cannot be an aryl group when the respective substituent has less than 6 carbon atoms.

Examples of suitable polycarboxylic acid include citric acid, malic acid and agaricic acid in addition to various commercially available compounds such as anhydride and hydrated acid. Of these, citric acid and malic acid are one of the preferred compatible agents.

Examples of acid ester advantageous in the present invention include N,N'-diethyl citric acid amide, N-phenyl citric acid amid, N-dodecyl citric acid amide, N,N'-didodecyl citric acid amide, and N-dodecyl malic acid.

The third type of polyfunctional compound of the compatible agent suitable for use in the present invention is a compound containing in the molecule both of (a) acid halide group, most preferably acid chloride group and (b) at least one of a carboxylic acid group, a carboxylic acid anhydride group, an acid ester group and an acid amide group, preferably a carboxylic acid group and an carboxylic acid anhydride group. Examples of the compatible agents encompassed in this type include trimellitic anhydride acid chloride, chloroformyl succinic anhydride, chloro fornyl succinic acid, chloroformyl glutaric anhydride, chloroformyl glutaric acid, chloroacetyl succinic anhydride, chloroacetyl succinic acid, trimellitic acid chloride, and chloroacetyl glutaric acid.

Further, this type of compatible agents can be reacted in advance with at least a part of polyphenylene ether to use as a polyphenylene ether functionalized compound.

The above compatible agents are described in detail in U.S. Pat. Nos. 4,315,086 and 4,642,358. They may be used alone or in combination. Further, they may be directly added at the time of melt mixing, or may be reacted in advance with one or both of polyphenylene ether and polyamide or other resinous material used for the production of the composition of the present invention.

An amount of the compatible agents is preferably 0.01 to 20 parts by weight, more preferably 0.1 to 10 parts by weight, based on 100 parts by weight of the mixture of polyamide and polyphenylene ether.

In the present invention, besides the above-listed components, an additional component may be added in the range where the effect of the components of the present invention are not deteriorated.

Examples of such an additional component are listed below.

There can be added other thermoplastic resins such as polyester and polyolefin; an inorganic filler such as talc, kaolin, zonotrite, wollastonite, titanium oxide, potassium titanate, carbon fiber and glass fiber; flame retardant such as a halogenated resin, silicone type flame retardant, magnesium hydroxide, aluminum hydroxide, an organophosphate ester compound, polyphosphate ammonium and red phosphorus; a fluorine polymer exhibiting effects for prevention of dropping; plasticizer such as oil, low molecular weight polyolefin, polyethylene glycol and aliphatic esters; and auxiliary flame retardant such as antimony trioxide each in an amount of less than 50 parts based on the total of 100 parts by weight of components (A), (B) and (C).

Further, there can be added additives such as an antioxidant, a ultraviolet absorbing agent, a light stabilizer, zinc oxide, zinc sulfate and a nucleating agent for polyamide, various peroxides, a slip agent, various dyes, pigment such as titanium oxide, a release agent, and a known silane coupling agent for improving affinity with the above-mentioned inorganic fillers and resins each in an amount of less than 10 parts based on the total of 100 parts by weight of components (A), (B) and (C).

These additional components can be used in combination.

Methods for producing the composition of the present invention include a heat melt kneading method using a single-screw extruder, a twin-screw extruder, a roll, a kneader, Brabender Plastograph, a Banbery mixer and the like. Of these, a melt kneading method using a twin-screw extruder is most preferred. A melt kneading temperature is not particularly limited, but a temperature where a preferable composition is obtained is optionally selected in the range generally from 240° to 360° C.

A production method employed in the present invention is not particularly limited, but there can be preferably exemplified various methods such as (1) a method comprising adding components (A), (B) and (C) at a time to melt knead; (2) a method comprising melt kneading component (B) in advance and subsequently adding components (A) and (C) to melt knead; (3) a method comprising melt kneading components (A) and (B) and subsequently adding component (C) to melt knead; (4) a method comprising melt kneading components (B) and (C) in advance and subsequently adding component (A) to melt knead; and (5) a method comprising melt kneading component (B) and a part of component (A) and subsequently adding a residual part of component (A) and component (C) to melt knead. As long as the effects of the present invention is not deteriorated, any of the methods can be employed.

The thus-obtained composition of the present invention is molded into articles applied to various parts according to the various known methods such as injection molding, extrusion molding and hollow molding.

The composition of the present invention can be advantageously used for exterior parts of motorcycles, interior parts of automobiles, outer plates and exterior parts such as fenders and door panels, and tray materials for integrated circuits in the electric and electronic fields.

Hereinafter, the present invention is illustrated referring to Examples.

PRODUCTION EXAMPLE 1

Production of PA66

Equimolar salt comprising adipic acid and hexamethylene diamine (2.4 kg) and pure water (2.5 kg) were fed into a 10 liter autoclave and fully stirred. After sufficiently substituted with nitrogen, the mixture was heated from room temperature to 220° C. over approximately one hour while stirring. At this time, the internal pressure of the autoclave reached around 1.77 MPa in terms of gauge pressure due to natural pressure caused by steam generated in the autoclave. Further, heating was continued for two hours while discharging steam from the reaction system so that the pressure would not be 1.77 MPa or more. Then, the stirring was stopped and the internal pressure of the autoclave was reduced to air pressure over approximately one hour by continuously discharging steam from the reaction system. Stopping the heating and shutting all the valves of the autoclave, the autoclave was cooled down to room temperature. After cooling, the autoclave was opened and approximately 2 kg of a polymer was taken out for grinding.

The resultant polymer had viscosity relative to sulfuric acid (ηr: polymer (1 g)/95.5% sulfuric acid (100 ml); temperature 25° C.) of 2.6, and concentrations of terminal carboxyl groups and terminal amino groups of 75 milliequivalent/kg and 45 milliequivalent/kg, respectively. The resultant polyamide (hereinafter simply abbreviated as PA) was named PA66.

PRODUCTION EXAMPLE 2

Production of PA66/6I

A polymer was obtained according to the same procedure as in Production Example 1 except that equimolar salt comprising adipic acid and hexamethylene diamine (2.00 kg), equimolar salt comprising isophthalic acid and hexamethylene diamine (0.50 kg), adipic acid for adjusting amolecular weight (6.9 g) and pure water (2.5 kg) were fed into the autoclave.

The resultant polymer had viscosity relative to sulfuric acid (ηr: polymer (1 g)/95.5% sulfuric acid (100 ml); temperature 25° C.) of 2.2. The resultant PA was named PA66/6I.

PRODUCTION EXAMPLE 3

Production of Modified PPE 2,6-dimethyl phenol was subjected to oxidative polymerization to obtain poly(2,6-dimethyl-1,4-phenylene ether) (hereinafter simply abbreviated as PPE) having a reducing viscosity of 0.52 (measured in 0.5 kg/dl chloroform solution at 30° C.). The resultant PPE (150 kg) and maleic anhydride (0.7 kg) as a modifier were fed in FM500 type Henschel mixer (manufactured by Mitsui Mining Co., Ltd.) applicable to jacket heating and nitrogen substitution was conducted. An agitating blade was rotated at a high speed to heat the content of the mixer to 200° C. over 50 minutes with shear heat. After the jacket temperature reached 200° C., the rotation at a high speed was continued for 5 minutes. Then, cool water was poured to the jacket for cooling it down to obtain modified polyphenylene ether (hereinafter abbreviated as MPPE) in a solid state.

The content (5 g) was dissolved into a chloroform solution (100 ml). Acetone (300 ml) was added dropwise to the solution to separate out polymer and the polymer was filtered out using a glass filter. After this operation was repeated three times, the obtained polymer was subjected to vacuum drying for 2 hours using a vacuum dryer, of which the temperature was set at 140° C.

Next, MPPE (1 g) was sandwiched between plates comprising laminating a polytetrafluoroethylene sheet, an aluminum sheet and a steel sheet from the inner side in the order listed, and was compression molded at 100 kg/cm$^2$ using a press molding machine, of which temperature was set at 280° C., to obtain films.

Each of the resultant films was subjected to infrared spectrophotometric analysis using a Fourier transform infrared spectrophotometer, FT/IR-420 manufactured by JASCO Corp. By the analysis on the MPPE film, a peak derived from maleic acid added to polyphenylene ether was observed at 1790 cm$^{-1}$.

An addition ratio of maleic anhydride, which was calculated out from a calibration curve equation prepared in advance using a mixture comprising PPE and maleic anhydride, was 0.34% by weight.

PRODUCTION EXAMPLE 4

Production of Maleic Anhydride-modified Ethylene-butent-1 Copolymer Prepared Using a Single Site Catalyst Maleic anhydride (1 part by weight) and a radical generator (0.3 parts by weight), Parhexa 25B manufactured by NOF Corp., were dry blended with an ethylene-butene-1 copolymer prepared using a single site catalyst (100 parts by weight) [Mooney viscosity $ML_{1+4}$ (100° C.) 16; MFR 3.6 g/10 min (190° C., 2.16 kg load)]. The resultant blend was fed to a co-rotating twin-screw extruder (ZSK-25 manufactured by Werner & Pfleiderer GmbH, Germany) and melt kneaded to obtain a modified ethylene-butene-1 copolymer. When a film prepared from the thus-obtained reactant was subjected to an analysis with an infrared spectrophotometer after extraction of acetone, an addition ratio of maleic anhydride was 0.9% by weight. The thus-obtained ethylene-butene copolymer modified with maleic acid was named MEBR-1.

PRODUCTION EXAMPLE 5

Production of Maleic Anhydride-modified Ethylene-butent-1 Copolymer Prepared Using a Ziegler Catalyst A modified ethylene-butene-1 copolymer was obtained according to the same procedure as in Production Example 4 except that the ethylene-butene-1 copolymer was changed to an ethylene-butene-1 copolymer prepared using a Ziegler catalyst [Mooney viscosity $ML_{1+4}$ (100° C.) 16; MFR 3.6 g/10 min (190° C., 2.16 kg load)]. The resultant reactant had an addition ratio of maleic anhydride of 0.85% by weight. The resultant ethylene-butene copolymer modified with maleic acid was named MEBR-2.

EXAMPLE 1

A co-rotating twin-screw extruder with upstream and downstream supply ports (ZSK-40 manufactured by Werner & Pfleiderer GmbH, Germany) was employed. A cylinder temperature of the extruder was set in the range of 320° to 280° C. From the upstream supply port, 37.8% by weight of PPE with a reducing viscosity of 0.52 at 30° C. in a chloroform solution (0.5 g/dl) and 0.28% by weight of maleic anhydride as a compatible agent were fed. From the downstream supply port, 56.7% by weight of PA66 prepared in Production Example 1 and 5.2% by weight of MEBR-1 prepared in Production Example 4 were fed. The fed components were extruded at a screw revolution speed of 300 rpm, cooled in a water bath and pelletized to obtain pellets.

In all of Examples, there were added 0.5 parts by weight of zinc oxide, 0.5 parts by weight of zinc sulfate, 0.15 parts by weight of copper iodide, 0.15 parts by weight of potassium iodide and 0.02 parts by weight of sodium montanite based on 100 parts by weight of the total of components (A), (B) and (C).

The resultant pellets were dried in vacuum at 100° C. for 5 hours, and molded into various test specimens using an injection molding machine (IS-80EPN manufactured by Toshiba Machine Co., Ltd.) of which cylinder temperature and mold temperature were set at 290° C. and 80° C., respectively.

As an index of impact resistance, notched Izod impact strength was measured according to ASTM-D256.

As an index of surface smoothness, average surface roughness (Ra: μm) was measured at a central part of a plate molded piece having a length of 90 mm, a width of 50 mm and a thickness of 2 mm using a contact surface roughness measuring apparatus.

Next, using a plate molded piece having a length of 100 mm, a width of 100 mm and a thickness of 2 mm, a water absorption rate and the dimensional changes after water absorption were measured.

The plate molded piece was heat sealed in an aluminum coated bag immediately after molding, and left in an atmosphere at 23° C. for 48 hours. Then, its weight ($W_0$), lengthwise size ($L_0$) and widthwise size ($H_0$) were measured. Then, after the plate molded piece was immersed in water at 23° C. for 21 days (3 weeks), weight ($W_{21}$), lengthwise size ($L_{21}$) and widthwise size ($H_{21}$) were measured.

Based on the obtained values, water absorption rate was calculated using the following equation (3):

$$[(W_{21}-W_0)/W_0] \times 100 \qquad (3)$$

Further, the dimensional changes after water absorption were calculated using the following equations (4) and (5):

$$\text{Dimensional change (lengthwise): } [(L_{21}-L_0)/L_0] \times 100 \qquad (4)$$

$$\text{Dimensional change (widthwise): } [(H_{21}-H_0)/H_0] \times 100 \qquad (5)$$

The measurement results are shown in Table 1 together with the composition.

EXAMPLE 2

The same procedure as in Example 1 was conducted except that:

from the upstream supply port, 34.5% by weight of PPE, 0.26% by weight of maleic anhydride and 8.6% by weight of a hydrogenated product of a styrene-butadiene-styrene triblock copolymer [bound styrene content 30% by weight; number-average molecular weight 200,000: hereinafter abbreviated as SEBS] as a hydrogenated product of the aromatic vinyl compound-conjugated diene compound copolymer were fed; and from the downstream supply port, 51.8% by weight of PA66 and 4.7% by weight of MEBR-1 were fed.

The measurement results are shown in Table 1 together with the composition.

COMPARATIVE EXAMPLE 1

The same procedure as in Example 1 was conducted except that MEBR-1 was changed to MEBR-2 prepared in Production Example 5. The measurement results are shown in Table 2 together with the composition.

EXAMPLE 3

The same procedure as in Example 1 was conducted except that:

from the upstream supply port, 33.7% by weight of PPE, 0.25% by weight of maleic anhydride and 8.4% by weight of SEBS were fed; and from the downstream supply port, 50.5% by weight of PA66, 4.6% by weight of MEBR-1 and 2.53% by weight of an electroconductive carbon black (Ketjen Black EC-600JD manufactured by Ketjen Black International Co., Ltd.; hereinafter abbreviated as KB) were fed.

Then, impact resistance, surface smoothness, water absorption rate and dimensional changes after water absorption were measured.

Next, as an index for electroconductivity, resistivity between end surfaces (width 6.4 mm; thickness 3.2 mm) of a molded piece (length 128 mm; width 6.4 mm; thickness 3.2 mm) was measured. Before the resistivity was measured, the end surfaces were coated with a silver paste, dried with air, and further dried in an oven at 80° C. for 30 minutes. The resistivity was determined by measuring resistivity at the time of applying 500 volts to the molded piece using a resistivity measuring apparatus (DG-525 manufactured by Sanwa Electric Instrument Co., Ltd.).

Volume resistivity (Ω·cm) was calculated by multiplying the obtained resistivity by an area coated with a silver paste and divided with the length of the molded piece. The volume resistivity calculated in the above procedure was defined as Volume Resistivity-A.

In order to measure an electroconductivity of a broken off surfaces as described in prior art, a molded piece (length 128 mm; width 6.4 mm; thickness 3.2 mm) was broken off at both ends to prepare a test specimen (length 70 mm) with fractured surfaces at both ends. The volume resistivity was calculated according to the same procedure as for Volume Resistivity-A, i.e., by coating the both fractured surfaces of the test specimen with a silver paste, drying the surfaces, and measuring resistivity of the specimen. The volume resistivity calculated in the above procedure was defined as Volume Resistivity-B.

The measurement results are shown in Table 1 together with the composition.

EXAMPLE 4

In the proportions shown in Table 1, there were incorporated the following components: PPE, Citric acid as a compatible agent;

Hydrogenated product of a styrene-isoprene diblock copolymer [bound styrene content 30% by weight, number-average molecular weight 60,000: hereinafter abbreviated as SEP];

PA66;

Modified maleic anhydride [octene content 28% by weight; MFR 0.8 g/10 min (190° C., 2.16 kg load), melting point 55° C. (according to DSC method; heating speed 10° C./min), addition ratio of maleic anhydride 1.0% by weight: hereinafter abbreviated as MEOR]; and Ethylene-octene-1 copolymer prepared using a single site catalyst [octene content 24% by weight, MFR 30 g/10 min (190° C., 2.16 kg load), melting point 60° C. (according to DSC method; heating speed 10° C./min): hereinafter abbreviated as EOR]. Then, the same procedure as in Example 3 was conducted.

The measurement results are shown in Table 1 together with the composition.

EXAMPLE 5

The same procedure as in Example 4 was conducted except that PA66 and SEP were changed to Polyamide 6 [Ube Nylon 1013B manufactured by Ube Industries, Ltd.: hereinafter abbreviated as PA6] and SEBS, respectively, and the components were incorporated in the proportion shown in Table 1. In this procedure, 25% by weight out of the total of PA6 was fed from the upstream supply port of the extruder and 75% by weight thereof was from the downstream supply port.

The measurement results are shown in Table 1 together with the composition.

EXAMPLE 6

The same procedure as in Example 5 was conducted except that both PA66 and P6 were employed as a polyamide component and the components were incorporated in the proportion as shown in Table 1. A half amount of PA6 was fed from the upstream supply port of the extruder and the other half was from the downstream supply port.

The measurement results are shown in Table 1 together with the composition.

EXAMPLE 7

The same procedure as in Example 3 was conducted except that the polyamide component was changed to PA66/6I prepared in Production Example 2. The measurement results are shown in Table 1 together with the composition. The resultant composition was composed of a continuous phase of PA66/6I and dispersed phases having a number-average dispersion diameter of 2 μm.

EXAMPLE 8

The same procedure as in Example 7 was conducted except that MEBR-1 was changed to a combination of MEOR and EOR and incorporated in the proportion as shown in Table 1.

EXAMPLE 9

The same procedure as in Example 5 was conducted except that citric acid was changed to maleic anhydride and incorporated in the proportion as shown in Table 1. The measurement results are shown in Table 1 together with the composition. The whole amount of PA6 was fed from the downstream supply port.

EXAMPLE 10

The same procedure as in Example 9 was conducted except that a third of the whole amount of PPE was changed to MPPE prepared in Production Example 3. The measurement results are shown in, Table 1 together with the composition.

EXAMPLE 11

The same procedure as in Example 9 was conducted except that the whole amount of PPE was changed to MPPE. The measurement results are shown in Table 1 together with the composition.

COMPARATIVE EXAMPLE 2

The same procedure as in Example 3 was conducted except that MEBR-1 was changed to SEBS. The measurement results are shown in Table 2 together with the composition.

COMPARATIVE EXAMPLE 3

The same procedure as in Example 3 was conducted except that MEBR-1 was changed to MEBR-2 prepared in Production Example 5. The measurement results are shown in Table 2 together with the composition.

COMPARATIVE EXAMPLE 4

The same procedure as in Example 5 was conducted except that 7.8% by weight of the total of MEOR and EOR was changed to a hydrogenated product of a styrene-isoprene-styrene triblock copolymer [bound styrene content 30% by weight, molecular weight 60,000: hereinafter abbreviated as SEPS]. The measurement results are shown in Table 2 together with the composition.

COMPARATIVE EXAMPLE 5

The same procedure as in Example 5 was conducted except that the whole of MEOR and EOR was changed to SEBS. The measurement results are shown in Table 2 together with the composition.

COMPARATIVE EXAMPLE 6

The same procedure as in Example 6 was conducted except that the whole of MEOR and EOR was changed to SEBS. The measurement results are shown in Table 2 together with the composition.

The comparison of Example 1 is Comparative Example 1. Compared with the composition obtained in Comparative Example 1, that obtained in Example 1 exhibited excellent impact resistance and surface smoothness and extremely small dimensional changes though it had almost the same water absorption as that of Comparative Example 1.

The composition obtained in Example 2 was such that prepared by adding a hydrogenated product of an aromatic vinyl compound-conjugated diene compound block copolymer to the composition of Example 1. Compared with the composition of Example 1, that of Example 2 was improved in the balance of impact resistance and surface smoothness.

Comparisons of Examples 3 to 6 are Comparative Examples 2 to 6. In Comparative Examples, the compositions were prepared using, instead of an ethylene-α-olefin copolymer prepared with a single catalyst, an ethylene-α-olefin copolymer prepared with catalysts other than a single site one, a common styrene-butadiene block copolymer, and a common styrene-isoprene copolymer. Compared with such compositions obtained in Comparative Examples, those obtained in Examples had excellent impact resistance, excellent surface smoothness and extremely small dimensional changes though they had almost the same water absorption as of the compositions of Comparative Examples, and exhibited electroconductivity without breaking off a molded piece.

Effect of the Invention

The composition of the present invention comprises polyphenylene ether, polyamide and an ethylene-α-olefin copolymer prepared using a single site catalyst, and exhibits excellent impact resistance, excellent surface smoothness and small dimensional changes after water absorption. Therefore, it can be widely applied to the use such as automobile parts, electric and electronic parts and mechanical parts.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Composition | | | | | | | | | | | | |
| *Fed from upstream supply port* | | | | | | | | | | | | |
| PPE | wt. % | 37.8 | 34.5 | 33.7 | 35.0 | 34.9 | 35.1 | 33.7 | 25.3 | 29.9 | 20.0 | |
| MPPE | wt. % | | | | | | | | | | 10.0 | 30.0 |
| Maleic anhydride | wt. % | 0.28 | 0.26 | 0.25 | | | | 0.25 | 0.20 | 0.20 | | |
| Citric acid | wt. % | | | | 0.68 | 0.68 | 0.68 | | | | | |
| SEBS | wt. % | | 8.6 | 8.4 | | 6.9 | 6.9 | 8.4 | 6.1 | 7.0 | 7.0 | 7.0 |
| SEP | wt. % | | | | 6.8 | | | | | | | |
| PA6 | wt. % | | | | | 11.8 | 11.8 | | | | | |
| *Fed from downstream supply port* | | | | | | | | | | | | |
| PA66 | wt. % | 56.7 | 51.8 | 50.5 | 46.7 | | 23.5 | | | 11.0 | 11.0 | 11.0 |
| PA66/6I | wt. % | | | | | | | | 50.5 | 51.6 | | |
| PA6 | wt. % | | | | | 35.5 | 11.8 | | | 36.9 | 37.0 | 37.0 |
| MEOR | wt. % | | | | 1.0 | 1.0 | 1.0 | | 0.6 | 0.5 | 0.5 | 0.5 |
| EOR | wt. % | | | | 6.8 | 6.8 | 6.8 | | 13.2 | 12.0 | 12.0 | 12.0 |
| MEBR-1 | wt. % | 5.2 | 4.7 | 4.6 | | | | 4.6 | | | | |
| KB | wt. % | | | 2.53 | 3.00 | 2.44 | 2.44 | 2.53 | 3.04 | 2.59 | 2.60 | 2.60 |
| Physical Property | | | | | | | | | | | | |
| Izod impact strength | J/m | 545 | 640 | 245 | 230 | 450 | 460 | 275 | 270 | 450 | 485 | 520 |
| Water absorption | wt. % | 4.0 | 4.2 | 4.1 | 3.9 | 3.9 | 3.8 | 3.4 | 3.5 | 3.8 | 3.8 | 3.8 |
| Dimensional change (lengthwise) | % | 0.64 | 0.60 | 0.59 | 0.63 | 0.65 | 0.64 | 0.55 | 0.53 | 0.60 | 0.63 | 0.62 |
| Dimensional change (widthwise) | % | 0.59 | 0.58 | 0.57 | 0.59 | 0.58 | 0.58 | 0.51 | 0.49 | 0.58 | 0.57 | 0.57 |
| Volume resistivity-A | Ω·cm | — | — | $4.5 \times 10^5$ | $3.1 \times 10^4$ | $5.6 \times 10^5$ | $4.8 \times 10^5$ | $1.0 \times 10^5$ | $6.6 \times 10^4$ | $1.2 \times 10^5$ | $6.8 \times 10^4$ | $1.9 \times 10^4$ |
| Volume resistivity-B | Ω·cm | — | — | $6.9 \times 10^3$ | $7.7 \times 10^2$ | $8.2 \times 10^2$ | $6.3 \times 10^2$ | $2.9 \times 10^3$ | $3.5 \times 10^2$ | $4.0 \times 10^3$ | $7.6 \times 10^2$ | $2.7 \times 10^2$ |
| Surface roughness (Ra) | μm | 0.174 | 0.157 | 0.203 | 0.283 | 0.256 | 0.278 | 0.186 | 0.222 | 0.176 | 0.156 | 0.122 |

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Composition | | | | | | | |
| *Fed from upstream supply port* | | | | | | | |
| PPE | wt. % | 37.8 | 33.7 | 33.7 | 35.0 | 34.9 | 35.1 |
| Maleic anhydride | wt. % | 0.28 | 0.25 | 0.25 | | | |
| Citric acid | wt. % | | | | 0.68 | 0.68 | 0.68 |
| SEBS | wt. % | | 13.0 | 8.4 | | 14.7 | 14.7 |
| SEP | wt. % | | | | 6.8 | | |
| SEPS | wt. % | | | | 7.8 | | |
| PA6 | wt. % | | | | | 11.8 | 11.8 |
| *Fed from downstream supply port* | | | | | | | |
| PA66 | wt. % | 56.7 | 50.5 | 50.5 | 46.7 | | 23.5 |
| PA6 | wt. % | | | | | 35.5 | 11.8 |

TABLE 2-continued

|  |  | Comparative Examples | | | | | |
|---|---|---|---|---|---|---|---|
|  |  | Comp. Ex. 1 | Comp. Ex. 2 | Comp. Ex. 3 | Comp. Ex. 4 | Comp. Ex. 5 | Comp. Ex. 6 |
| MEBR-2 | wt. % | 5.2 |  | 4.6 |  |  |  |
| KB | wt. % |  | 2.53 | 2.53 | 3.00 | 2.44 | 2.44 |
| Physical Property |  |  |  |  |  |  |  |
| Izod impact strength | J/m | 490 | 110 | 195 | 155 | 175 | 140 |
| Water absorption | wt. % | 4.2 | 4 | 4 | 3.8 | 3.9 | 3.9 |
| Dimensional change (lengthwise) | % | 0.95 | 0.92 | 0.84 | 0.86 | 0.83 | 0.86 |
| Dimensional change (widthwise) | % | 0.89 | 0.86 | 0.79 | 0.81 | 0.74 | 0.81 |
| Volume resistivity-A | Ω·cm | — | ∞ | ∞ | ∞ | ∞ | ∞ |
| Volume resistivity-B | Ω·cm | — | $5.5 \times 10^3$ | $5.5 \times 10^4$ | $2.8 \times 10^5$ | $7.1 \times 10^5$ | $5.4 \times 10^5$ |
| Surface roughness (Ra) | μm | 0.293 | 0.386 | 0.386 | 0.411 | 0.368 | 0.406 |

What is claimed is:

1. A composition comprising:
   (A) 50 to 95% by weight of polyamide based on the total of components (A) and (B);
   (B) 50 to 5% by weight of polyphenylene ether based on the total of components (A) and (B); and
   (C) 1 to 30 parts by weight, based on 100 parts by weight of the total of components (A) and (B), of an ethylene-α-olefin copolymer prepared using a single site catalyst and/or an ethylene-α-olefin copolymer prepared using a single site catalyst and modified with one or more compounds selected from the group consisting of α,β-unsaturated dicarboxylic acid and derivatives thereof;
   wherein the α-olefin is a $C_{3-20}$ α-olefin;
   wherein the composition contains at least one compatibilizing agent selected from the group consisting of a) a copolymer comprising an aromatic vinyl compound and α,β-unsaturated dicarboxylic acid and/or derivatives thereof, b) maleic anhydride, c) fumaric acid, d) citric acid and e) malic acid.

2. The composition according to claim 1, wherein component (A) of polyamide forms a continuous phase, and components other than component (A) form dispersed phases which have a number-average distribution diameter of 10 μm or less.

3. The composition according to claim 1 or 2, wherein component (C) of an ethylene-α-olefin copolymer has a molecular weight distribution (weight-average molecular weight/number-average molecular weight) of 3 or less.

4. The composition according to claim 2, wherein the single site catalyst used for the preparation of component (C) of the ethylene-α-olefin copolymer contains one or more catalysts containing 1 to 3 cyclopentadienyl or substituted cyclopentadienyl molecules.

5. The composition according to claim 1 or 2, wherein the ethylene unit content of component (C) of the ethylene-α-olefin copolymer is 30 to 95% by weight.

6. The composition according to claim 1 or 2, wherein an electroconductive filler is incorporated as component (D) in an amount of less than 10 parts by weight based on 100 parts by weight of the total of components (A), (B) and (C).

7. The composition according to claim 1, wherein a block copolymer of an aromatic vinyl compound and a conjugated diene compound and/or a hydrogenated product thereof is incorporated as component (E) in an amount of less than 30 parts by weight based on 100 parts by weight of the total of components (A), (B) and (C).

8. The composition according to claim 7, wherein component (E) is a block copolymer of an aromatic vinyl compound and a conjugated diene compound having a content of an aromatic vinyl compound of 15 to 65% by weight and a number-average molecular weight using a polystyrene standard of 80,000 to 300,000 and/or a hydrogenated product thereof.

9. The composition according to claim 1 or 2, wherein the compatibilizing agent is at least one selected from the group consisting of b) maleic anhydride, c) fumaric acid, d) citric acid and e) malic acid.

10. The composition according to claim 1 or 2, wherein a part or all of component (B) of polyphenylene ether is modified polyphenylene ether obtained by reacting one or more compounds selected from the group consisting of maleic anhydride, fumaric acid, glycidyl acrylate and glycidyl methacrylate with non-melted polyphenylene ether in the presence or absence of a radical initiator at a temperature from 100° C. to a glass transition point of polyphenylene ether.

11. The composition according to claim 6, wherein component (D) of the electroconductive filler is an electroconductive carbon black.

12. The composition according to claim 1, wherein an electroconductive filler is incorporated as component (D) in an amount of less than 10 parts by weight based on 100 parts by weight of the total of components (A), (B) and (C).

13. The composition according to claim 2, wherein an electroconductive filler is incorporated as component (D) in an amount of less than 10 parts by weight based on 100 parts by weight of the total of components (A), (B) and (C).

14. The composition according to claim 12, wherein component (D) of the electroconductive filler is an electroconductive carbon black.

15. The composition according to claim 13, wherein component (D) of the electroconductive filler is an electroconductive carbon black.

16. The composition according to claim 12, wherein a block copolymer of an aromatic vinyl compound and a conjugated diene compound and/or a hydrogenated product thereof is incorporated as component (E) in an amount of less than 30 parts by weight based on 100 parts by weight of the total of components (A), (B) and (C).

17. The composition according to claim 13, wherein a block copolymer of an aromatic vinyl compound and a conjugated diene compound and/or a hydrogenated product thereof is incorporated as component (E) in an amount of less than 30 parts by weight based on 100 parts by weight of the total of components (A), (B) and (C).

18. The composition according to claim 16, wherein component (E) is a block copolymer of an aromatic vinyl compound and a conjugated diene compound having a content of an aromatic vinyl compound of 15 to 65% by weight and a number-average molecular weight using a polystyrene standard of 80,000 to 300,000 and/or a hydrogenated product thereof.

19. The composition according to claim 17, wherein component (E) is a block copolymer of an aromatic vinyl compound and a conjugated diene compound having a content of an aromatic vinyl compound of 15 to 65% by weight and a number-average molecular weight using a polystyrene standard of 80,000 to 300,000 and/or a hydrogenated product thereof.

20. The composition according to claim 1, wherein the single site catalyst used for the preparation of component (C) of the ethylene-α-olefin copolymer contains one or more catalysts containing 1 to 3 cyclopentadienyl or substituted cyclopentadienyl molecules.

21. The composition according to claim 20, wherein the ethylene unit content of component (C) of the ethylene-α-olefin copolymer is 30 to 95% by weight.

22. The composition according to claim 21, wherein component (C) of an ethylene-a-olefin copolymer has a molecular weight distribution (weight-average molecular weight/number-average molecular weight) of 3 or less.

23. The composition according to claim 1, wherein a part or all of component (B) of polyphenylene ether is modified polyphenylene ether obtained by reacting one or more compounds selected from the group consisting of maleic anhydride, fumaric acid, glycidyl acrylate and glycidyl methacrylate with non-melted polyphenylene ether in the presence or absence of a radical initiator at a temperature from 100° C. to a glass transition point of polyphenylene ether.

* * * * *